(12) United States Patent
Huat

(10) Patent No.: US 6,655,620 B2
(45) Date of Patent: Dec. 2, 2003

(54) SPINNING-REEL OSCILLATING MECHANISM

(75) Inventor: Ng Keng Huat, Singapore (SG)

(73) Assignee: Shimano Inc., Osaka (JP)

( * ) Notice: Subject to any disclaimer, the term of this patent is extended or adjusted under 35 U.S.C. 154(b) by 76 days.

(21) Appl. No.: 09/949,665

(22) Filed: Sep. 12, 2001

(65) Prior Publication Data

US 2002/0033427 A1 Mar. 21, 2002

(30) Foreign Application Priority Data

Sep. 18, 2000 (JP) .......................................... 2000-281786

(51) Int. Cl.[7] .............................................. A01K 89/01
(52) U.S. Cl. .............................. 242/242; 74/55; 74/569
(58) Field of Search ................................ 242/241, 242; 74/55, 567, 569

(56) References Cited

U.S. PATENT DOCUMENTS

| | | | | |
|---|---|---|---|---|
| 2,528,386 A | * | 10/1950 | Napper | .......................... 74/55 |
| 3,367,597 A | | 2/1968 | Morritt | |
| 5,513,814 A | * | 5/1996 | Zanon | ......................... 242/241 |
| 5,921,489 A | * | 7/1999 | Shibata | ......................... 242/242 |
| 6,000,653 A | * | 12/1999 | Okada | ......................... 242/242 |
| 6,264,125 B1 | * | 7/2001 | Cockerham et al. | ......... 242/242 |
| 6,394,379 B1 | | 5/2002 | Ivie | |
| 6,484,956 B2 | * | 11/2002 | Kawabe et al. | .............. 242/278 |

* cited by examiner

*Primary Examiner*—Emmanuel Marcelo
(74) *Attorney, Agent, or Firm*—Shinjyu Global IP Counselors, LLP

(57) ABSTRACT

Simple configuration in a low-gear-ratio type oscillating mechanism for realizing at high transmission efficiency improved lay in the line windings. Spinning reel oscillating mechanism (6), a mechanism that reciprocates the spool (12) in cooperation with rotation of handle (1), is furnished with gear piece (21) and slider (22). The gear piece rotates cooperatively with handle rotation, and is a component on whose one lateral face first and second cam portions (21a), (21b) are formed rim-wise. The slider is attached, immovably in the spool axial direction, at its tip to the rearward end of a spool shaft 20 for the spool, and has: a first cam engager (22a) that extends in a direction intersecting the spool shaft and engages with the first cam, and a second cam engager (22b) that extends in the same direction as the first cam engager and engages with the second cam; and is for reciprocating in the spool axial direction by engagement with either the two cams or the two cam engagers.

20 Claims, 13 Drawing Sheets

SPINNING-REEL OSCILLATING MECHANISM

BACKGROUND OF THE INVENTION

1. Technical Field

The present invention relates to oscillating mechanisms; in particular to spinning-reel oscillating mechanisms that in cooperation with rotation of the handle axially reciprocate the spool in a spinning reel.

2. Description of Related Art

Spinning reels, which, turning on the longitudinal axis of the fishing rod wind on fishing line, are provided with oscillating mechanisms that reciprocate the line-winding spool back and forth. Among oscillating mechanisms of this sort, low-gear-ratio type oscillating mechanisms have been known conventionally.

Low-gear-ratio type oscillating mechanisms are furnished with a gear piece that rotates about an axis parallel to the handle shaft, and a slider element that is reciprocated in the spool axial direction by rotation of the gear piece. The gear piece meshes with a drive gear provided on the handle-rotating shaft. Engagement projections are formed on the rim of the gear piece on one lateral face. Engagement grooves that engage with the engagement projections are formed on the slider lateral face opposing the gear piece. The engagement grooves ordinarily extend rectilinearly in a direction orthogonal to the spool shaft. The slider element is fixed to the hind end of the spool shaft, on fore end of which the spool is fitted.

In oscillating mechanisms thus structured, when the gear piece rotates in cooperation with rotation of the handle, the rotational motion of the gear piece is converted into recti-linear motion of the slider element by sliding engagement of the engagement projections with the engagement grooves, and the spool reciprocates axially.

In the foregoing conventional oscillating mechanisms, since rotational motion is changed into rectilinear motion, the shifting speed in the spool axial direction changes under a trigonometric function. The shifting speed therefore becomes slower immediate either end of, and faster immediate the middle of, the slider element's stroke. Consequently, more fishing line winds on at either end of the spool than in the middle, which is liable to disfigure the lay of the line windings. Disfiguration in the winding lay is likely to lead to annoyances such as the fishing line reeling out in a bunch from the front end of the spool.

To address this issue, in Laid-Open Pat. Gazette No. H8-191650 disclosure is made of having: an approximately elliptical cam groove, formed in the reel body; and, fitted in between the gear piece and the slider element, a rotary body on which are formed on one face a first projection that engages into the cam groove, with on the other face a second projection, equivalent to an engagement projection for sliding engagement with engagement grooves in the slider element.

In the thus configured oscillating mechanism, when the handle shaft rotates, the gear piece linked to it rotates. When the gear piece rotates, the rotary body orbits, turning also on the rotational axis of the gear piece. Again, because the second projection is engaged with the slider element, rotation of the rotary body moves the slider element back and forth. Reciprocation of the slider element moves the spool shaft axially back and forth. Further, since the first projection is engaged in the cam groove, the rotary body's gyration is governed, nearly evening out the speed of the slider element reciprocation, which improves the lay of the line-windings.

The rotary body in between the gear piece and the slider element must be provided in the foregoing conventional, rotary-body-equipped oscillating mechanism, which therefore increases the constituent parts and complicates the oscillating mechanism configuration. Moreover, it has two-fold sliding components—for sliding between the first projection and the cam groove, and for sliding between the second projection and the engagement groove—which therefore degrades the transmission efficiency due to friction in the sliding components. This means that the efficiency with which cranking power is transmitted in converting handle rotation into reciprocation of the slider element could be higher.

SUMMARY OF THE INVENTION

An object of the present invention is by a simple configuration in spinning reels having a low gear ratio oscillating mechanism to improve the lay in the line windings, and to realize the improvement at high handle-cranking to spool-oscillating power transmission efficiency.

A spinning-reel oscillating mechanism in terms of the first aspect of the invention is a mechanism that oscillates the spinning reel spool axially in cooperation with handle rotation, and is furnished with a rotary member, a first cam, a second cam, a slider member, first cam engager, and a second cam engager. The rotary member is a component that rotates around an axis approximately parallel to the handle rotational axis, in cooperation with rotation of the handle. The first cam provided on the rotary member. The second cam is provided on the rotary member, where its diametric position differs at least partially from that of said first cam. The slider member is a component attached, immovably at least in the spool axial direction, rear-endwise to a spool shaft on the fore end of which is the spool, and fitted in the reel body free to shift in the spool axial direction. The first cam engager is provided in the slider member, extending in a direction that intersects the spool axis, and engages said first cam. The second cam engager is provided in the slider member, extending in the same direction as the first cam engager, and engages the first cam; and the slider is oscillated in the spool axial direction by engagement on at least the one part of either the first cam and the first cam engager, or of the second cam and the second cam engager.

In this oscillating mechanism, when the handle is rotated, the rotary member rotates in cooperation therewith. When the rotary member rotates, engagement of either the first cam with the first cam engager, or the second cam with the second cam engager reciprocates the slider member in the spool axial direction. Thus, engagement of the first cam with the first cam engager, and engagement of the second cam with the second cam engager takes place selectively. Therefore, switching over between a high-speed cam and a low-speed cam at either end and in the middle of the slider member's stroke, for example, realizes in a simple manner a state near uniform-velocity rectilinear motion. Herein, since the slider member is reciprocatingly shifted by dual-type cam switchover between first and second cams whose diametric positions differ at least partially, and first and second cam engagers, the slider component reciprocates in a state near uniform-velocity rectilinear motion, which improves the line-winding lay. Moreover, extra parts need not be provided between the rotary member and the slider member, simplifying the configuration and making the sliding components fewer, which maintains high drive-power transmission efficiency.

A spinning-reel oscillating mechanism in terms of the second aspect of the invention is a mechanism set forth by the first aspect, wherein the first cam projects diametrically outward more than the second cam. In this case, because the first cam is located diametrically further outward than the second cam, the amount with respect to rotation of the gear piece the slider member shifts under engagement of the first cam and the first cam engager is larger than the amount it shifts under engagement of the second cam and the second cam engager. That is, a high-speed cam is constituted by the first cam and first cam engager, and a low-speed cam is constituted by the second cam and second cam engager. Thus arranging for high/low-speed cams, as such, the first cam and first cam engager are configured so as to enable high-speed travel at either end of the stroke—where travel is at comparatively low-speed with respect to rotation of the rotary member—and the second cam and second cam engager are configured so as to enable low-speed travel in the mid portion of the stroke—where the travel is at comparatively high-speed: which by a simple structure brings reciprocation of the slider with respect to rotation of the rotary member near to uniform-velocity rectilinear motion, improving the line-winding lay.

A spinning-reel oscillating mechanism in terms of the third aspect of the invention is a mechanism set forth by the first or second aspect of the invention, wherein the first cam and the second cam are provided in the same circumferential position projecting sideways from the rotary member and parallel to the rotational axis. In this case, the fact that the position of the two cams in the circumferential is the same simplifies the form of the cam engagers.

A spinning-reel oscillating mechanism in terms of the fourth aspect of the invention is a mechanism set forth by any of the first through third aspects, wherein both the cams have diametrically inside and outside engagement surfaces with which both the cam engagers respectively engage. In this case, the fact that engagement surfaces on the outside, on the one hand, of the two cams, and engagement surfaces on the inside, on the other hand, are engaged by the two cam engagers restrains jerkiness as the slider member is reciprocated.

A spinning-reel oscillating mechanism in terms of the fifth aspect of the invention is a mechanism set forth by the fourth aspect of the invention, wherein when the diametrically outside engagement surface on the first cam is engaged with the first cam engager, the diametrically inside engagement surface on the second cam is engaged with the second cam engager; and when the diametrically outside engagement surface on the second cam is engaged with the second cam engager, the diametrically inside engagement surface on the first cam is engaged with the first cam engager. In this case, the fact that engagement surfaces on the outside, on the one hand, of the two cams, and engagement surfaces on the inside, on the other hand, are engaged with the two cam engagers restrains jerkiness as the slider member is reciprocated.

A spinning-reel oscillating mechanism in terms of the sixth aspect of the invention is a mechanism set forth by any of the first through third aspects, wherein the second cam is formed projecting from the first cam and parallel to the rotational shaft, moreover. In this case, the two cams that, in the same circumferential location, differ in diametrical position may be formed with ease.

A spinning-reel oscillating mechanism in terms of the seventh aspect of the invention is a mechanism set forth by any of the second through sixth aspects of the invention, wherein the first cam and the first cam engager engage mainly immediate either end of the stroke of the slider member; and the second cam and the second cam engager engage mainly immediate the middle of the stroke of the slider member. In this case, as such, with the first cam and first cam engager, high-speed travel is enabled at either end of the stroke—where travel is at comparatively low speed with respect to rotation of the rotary member—and with the second cam and second cam engager low-speed travel is enabled in the mid portion of the stroke—where the travel is at comparatively high speed. Therefore, by a simple structure reciprocation of the slider with respect to rotation of the rotary member is brought near to uniform-velocity rectilinear motion, improving the line-winding lay.

A spinning-reel oscillating mechanism in terms of the eighth aspect of the invention is a mechanism set forth by any of the second through seventh aspects, wherein the first cam and second cam are formed in step fashion. In this case, the two cams differ in diametrical position may be formed with ease.

A spinning-reel oscillating mechanism in terms of the ninth aspect of the invention is a mechanism set forth by the eighth aspect of the invention, wherein the diametrically outside engagement surfaces on the first cam and the second cam that engage the first cam engager and the second cam engager are respectively rounded into semicircular form. In this case, while by forming the two cams in step fashion their diametrical positions staggered, at the same time by rounding their engagement surfaces into semicircular form, the cams and cam engagers make point contact in the rotational direction, which smoothly shifts the slider member with respect to rotation of the rotary member.

A spinning-reel oscillating mechanism in terms of the tenth aspect of the invention is a mechanism set forth by the eighth aspect, wherein the diametrically outside engagement surface on the first cam that engages the first cam engager is rounded into a semicircular form; and the diametrically outside engagement surface on the second cam that engages the second cam engager is shaped into a triangular form whose tip assumes sphericity. In this case, by making the diametrically outer sides of the two cams differ in form, the slider member is shifted smoothly.

A spinning-reel oscillating mechanism in terms of the eleventh aspect of the invention is a mechanism set forth by any of the second through tenth aspects of the invention, wherein both the cam engagers are formed symmetrically with respect to a fist axis orthogonal to the spool shaft, and to a second axis orthogonal to the first axis and moreover coinciding with the rotational center axis of the rotary member; moreover along the second axis an interval in the first cam engager is narrower than an interval in the second cam engager, and the interval in the first cam engager gradually widens going away from the second axis on either side in the first axis direction and along the way becomes wider than the interval in the second cam engager. In this case, the fact that for the first cam and first cam engager that are the high-speed cam, the interval gradually narrows from either end along the second axis makes larger the amount by which the slider member travels with respect to rotation of the rotary member as it rotates toward the second axis.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

First Embodiment
Overall Configuration and Reel Unit Configuration

Figure 1:
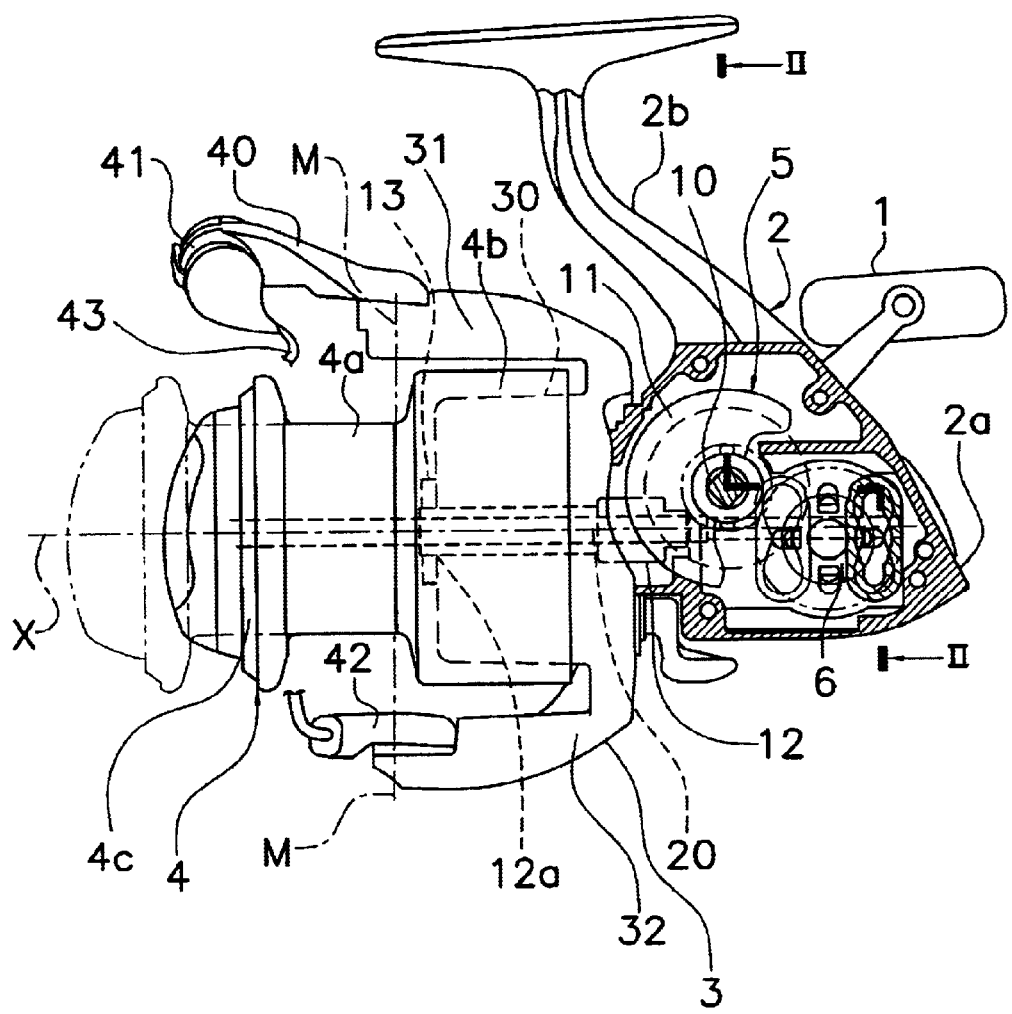
FIG. 1 is a partly in section lateral view of a spinning reel in which one embodiment of the present invention is adopted.
Figure 2:
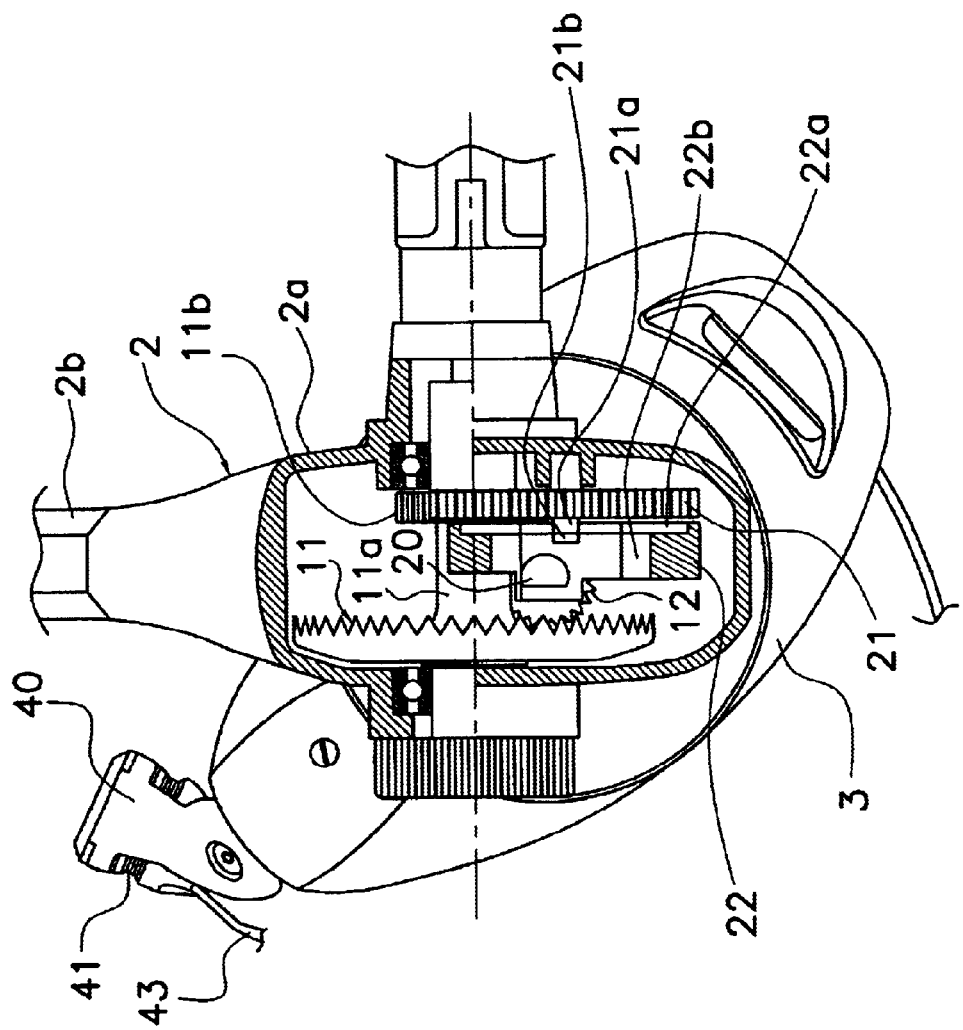
FIG. 2 is an enlarged fragmentary rear view of the spinning reel, and sectional taken along II—II and seen in the direction of the arrows, in FIG. 1.

The spinning reel shown in FIGS. 1 and 2, in which one embodiment of the present invention is adopted, is furnished with: a reel unit 2 having a handle 1; a rotor 3 supported free to rotate in the front of the reel unit; and a spool 4, disposed on the front of the rotor 3, onto which fishing line is wound.

The reel unit 2 has a body 2a in the upper part of which a mount 2b for attaching the spinning reel to a fishing rod is formed. A rotor drive mechanism 5 for translating the rotor 3, and an oscillating mechanism for pumping the spool 4 back and forth along its rotational center axis to wind fishing line evenly onto the spool are provided in the interior of the body 2a.

The rotor drive mechanism 5 has a face gear 11 that rotates together with a handle shaft 10 to which the handle 1 is fixed, and a pinion gear that meshes with the face gear 11. The face gear has a tubular axle 11a through which the handle shaft 10, rectangular in cross section, penetrates. The pinion gear 12 is tubularly formed and its front 12a extends toward the spool 4, penetrating the center of the rotor 3. The mid-portion and rear-end of the pinion gear 12, in its axial direction, are supported rotatively via respective bearings (not shown).

Oscillating Mechanism Configuration

Figure 3:
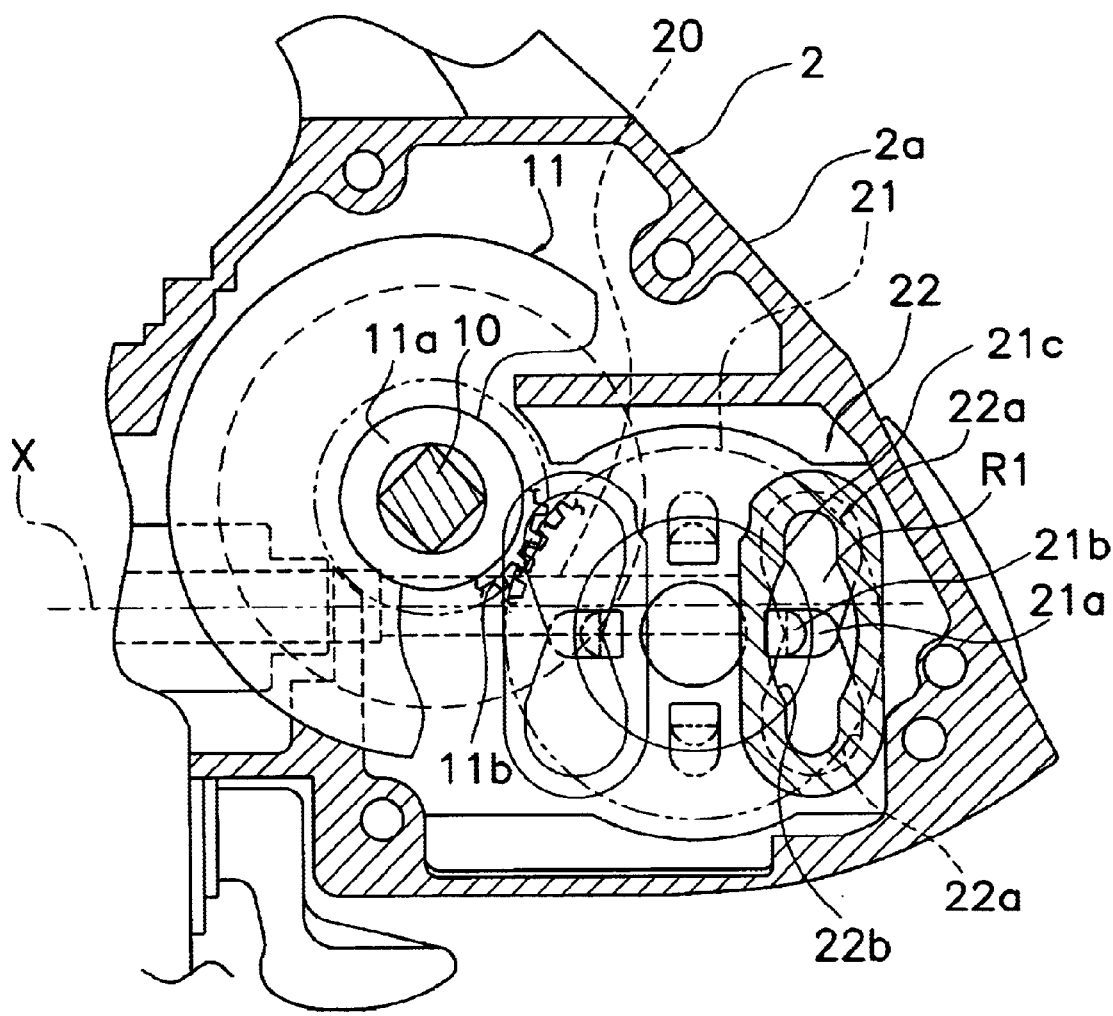
FIG. 3 is an enlarged fragmentary view including the sectional portion of FIG. 1, showing details of an oscillating mechanism in the spinning reel.
Figure 4:
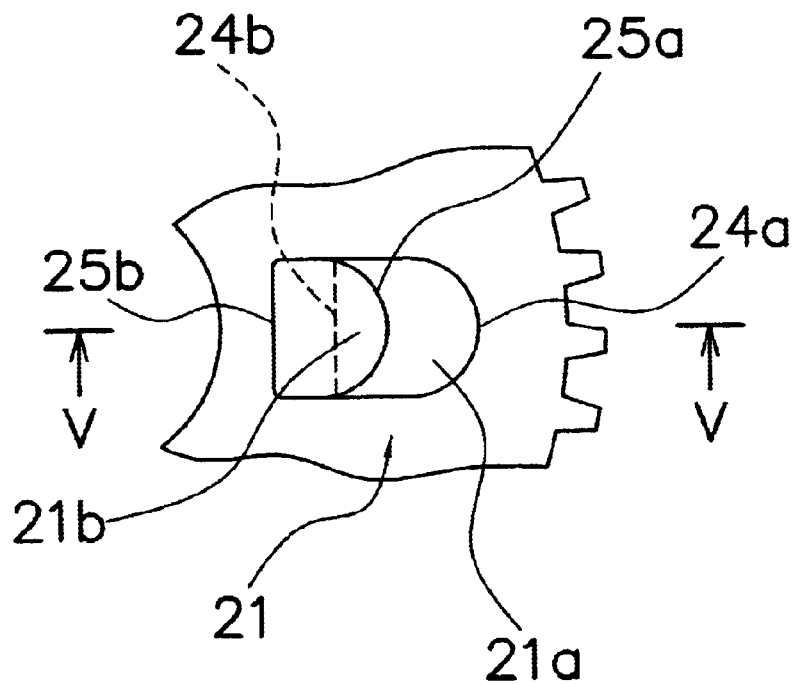
FIG. 4 is a elevational view showing first and second cams on a fragmentarily depicted gear piece from the oscillating mechanism.

The oscillating mechanism 6 is, as indicated in FIGS. 2 and 3, a device that reciprocates a spool shaft 20 fixed into the center of the spool 4 in the front-to-rear direction, to pump the spool 4 in the same direction. The oscillating mechanism 6 has a gear piece 21 that rotates cooperatively with the face gear 11, and a slider 22 that in cooperation with rotation of the gear piece 21 reciprocates in the spool axial direction.

The gear piece 21 is fitted, free to rotate around an axis approximately parallel with the handle shaft 10, to a wall surface of the reel body 2a. The gear piece 21 meshes with a drive gear 11b formed on the axle 11a for the face gear 11. A first cam 21a and a second cam 21b that project toward the slider 22 are formed on the rim of the gear piece 21 lateral face opposing the slider 22.

The first cam 21a, as shown in FIG. 2 through FIG. 5, projects toward the slider 22 from the lateral face of the gear piece 21, and is located diametrically further outward than the second cam 21b. The second cam 21b is of about the same width as the first cam 21a, and is slightly shorter in length along the diametric direction. The second cam 21b further projects from the first cam 21a toward the slider 22. Both cams 21a, 21b are formed in the same circumferential position on the gear piece 21. Diametrically outward engagement surfaces 24a, 25a on the two cams 21a, 21b are semicircular arc shapes, and diametrically inward engagement surfaces 24b, 25b are rectilinear in form, slightly rounded at either end. The two cams 21a, 21b are conformed as though electronic AND gate symbols whose the width is the same but that differ in length were arranged diametrically staggered.

By means of the reel unit 2 the slider 22 is supported free to reciprocate axially parallel to the spool shaft 20. The slider 22 is non-rotatably, axially immovably attached hindendwise to the spool shaft 20, on the fore end of which is the spool 4. The slider 22 has a through-hole R1 formed thereon. A first cam-engagement slot 22a into which the first cam 21a on the gear piece 21 engages, and a second cam-engagement slot 22b into which the second cam 21b engages are formed around the through-hole R1 on the lateral face of the slider 22 that opposes the gear piece 21. Engagement of the first cam 21a and the first cam-engagement slot 22a, and engagement of the second cam 21b and the second cam-engagement slot 22b, realize a high-speed cam and a low-speed cam, respectively.

Figure 5:
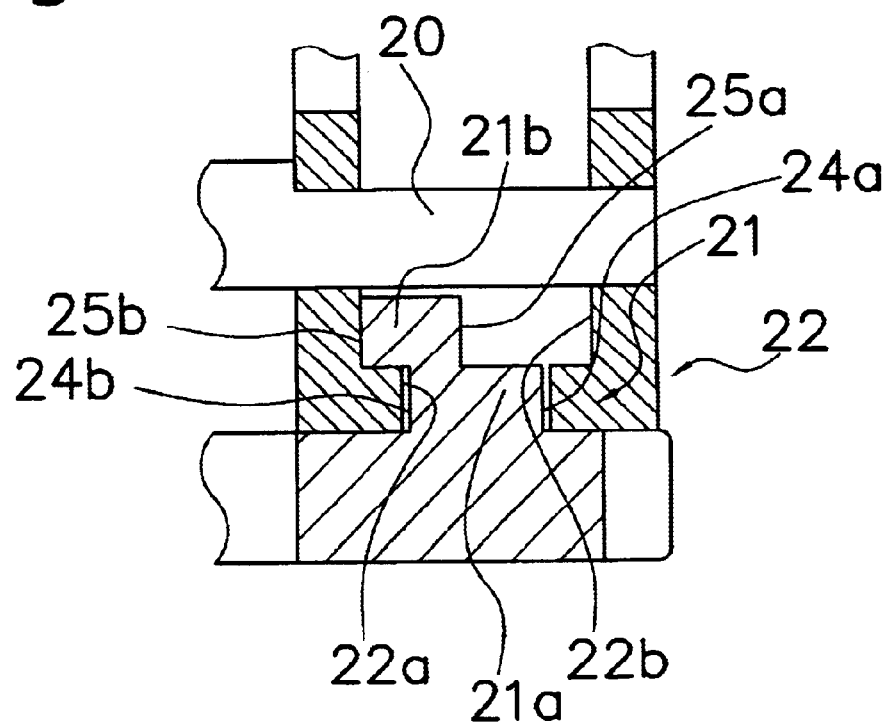
FIG. 5 is a fragmentary sectional view taken through V—V and seen in the direction of the arrows in FIG. 4.
Figure 6:
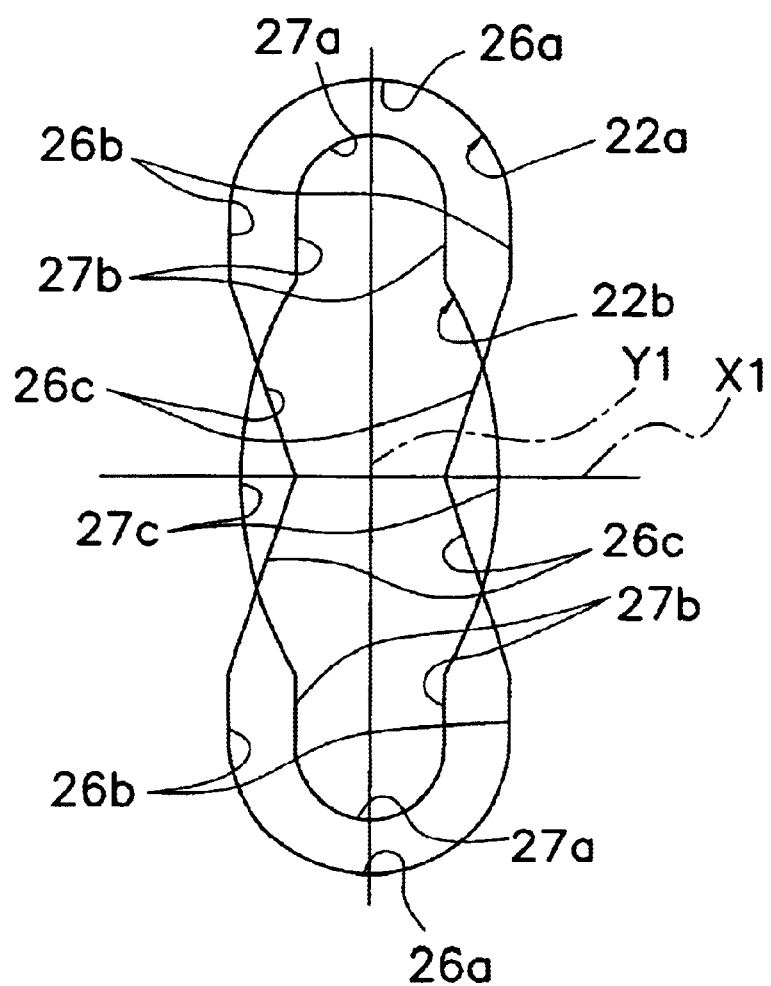
FIG. 6 is a diagram illustrating the conformation of first and second cam-engagement slots formed in a slider from the oscillating mechanism.

The two slots 22a, 22b, as shown in FIG. 5 and FIG. 6, extend in a first axis Y1 direction orthogonal to the spool shaft 20 center axis X1, are slots shaped symmetrically with respect to the first axis Y1, and are formed queued in the projecting direction of the first and second cams 21a, 21b. Further, the two slots 22a, 22b are in the form of slots symmetrical with respect to the second axis X1, which is orthogonal to the first axis Y1 and at the same time goes through the rotational center axis of the gear piece 21. For engagement with the first cam 21a, the length of the first cam-engagement slot 22a in the direction orthogonal to the spool shaft 20 is longer than the second engagement slot 22b.

The first cam-engagement slot 22a includes: first semicircular arcs 26a, formed at either end in the direction orthogonal to the spool shaft 20; first opposing portions 26b formed in parallel heading from the first semicircular arcs 26a toward the second axis X1; and first sloped portions 26c formed slanting from the first opposing portions 26b toward the center of the slot 22a such that the interval narrows gradually.

The second cam-engagement slot 22b includes: second semicircular arcs 27a, formed diametrically smaller than the first semicircular arcs 26a, at either end in the direction orthogonal to the spool shaft 20; second opposing portions 27b formed in parallel heading from the second semicircular arcs 27a toward the center (second axis X1); and second sloped portions 27c formed in a curve sloping from the second opposing portions 27b toward the center such that the interval broadens gradually, becoming wider along the way than the first sloped portions 26c. The second sloped portions 27c are of a form enabling the engagement surface 25b on the second cam 21b to be in constant contact while the first engagement surface 21a on the first cam 21a is engaged in the first cam-engagement slot 22a.

The interval between the second opposing portions 27b is substantially the same as or somewhat larger than the width of the second cam 21b. The interval between on the one hand the first sloped portions 26c and on the other the second sloped portions 27c along their centers (on the second axis X1), is substantially the same as or somewhat greater than the length from the engagement surface 21a on the first cam 21a to the engagement surface 25b on the second cam 21b. Engagement between the first cam 21a and the first cam-engagement slot 22a, and engagement between the second cam 21b and the second cam-engagement slot 22b switch over midway, converting the rotational movement of the gear piece 21 into reciprocating rectilinear movement of the slider 22 and pumping the spool 4 in the spool shaft direction.

Herein, the conversion ratio of rotational movement to reciprocation in the high-speed cam by engagement of the diametrically outward positioned first cam 21a with the first cam-engagement slot 22a, is larger than the ratio in the low-speed cam by engagement of the second cam 21b with the second cam-engagement slot 22b. Therefore, due to the switching over of the two cam types such that high-speed cam engagement—in rotational positions about 45 degrees from either end of the stroke of the slider 22, where its shifting speed becomes slower—and low-speed cam engagement—in an about 45-degree rotational position in the intermediate portion where the shifting speed gets faster—respectively take place, the rotational movement is converted into a state near uniform-velocity rectilinear motion. Further, when the slider 22 is under engagement with the first cam 21a, the fact that the first sloped portions 26c that make the interval narrower are provided means that on either end the amount of movement per rotational angle accompanying shifting is large, such that uniform rectilinear motion is sustained.

Rotor Configuration

The rotor 3 has, as shown in FIG. 1, a circular cylindrical portion 30, and first arm 31 and second arm 32 provided in mutual opposition sideways on the circular cylindrical portion 30. The circular cylindrical portion 30 is a closed-ended cylindrical component having its base in the front; the circular cylindrical portion 30, and the two arms 31, 32 are formed unitarily.

A boss is formed in the center of the circular cylindrical portion 30 base, and the pinion gear 12 front 12a and the spool shaft 20 penetrate the boss. In turn, at the front 12a of the pinion gear 12, the rotor 3 is non-rotatably fixed to the pinion gear 12 by a nut 13.

On the tip-end outer peripheral side of the first arm 31, a first bail-support member 40 is pivotally attached. A line roller 41 for guiding fishing line onto the spool 4 is fitted to the tip of the first bail-support member 40. Again, on inner peripheral side of the tip of the second arm 32, a second bail-support member 42 is pivotally attached. A bail 43 is provided between the line roller 41 on the first bail-support member 40 tip, and the second bail-support member 42. The first bail-support member 41 and the second bail-support member 42 pivot around pivotal axis M. The pivotal axis M is disposed leaning such that the second bail-support member 42 side positions tip-ward.

Spool Configuration

The spool 4 is disposed in between the first arm 31 and second arm 32 on the rotor, and is fitted to the fore end of the spool shaft 20 via a drag mechanism (not shown). The spool 4 includes: a bobbin trunk 4a circumferentially around which fishing line winds; a skirt 4b formed unitarily with the rear of the bobbin trunk 4a; and a flange plate 4c fixed to the front end of the bobbin trunk 4a. The flange plate is formed from a stainless-steel sheet material, and is mounted onto the bobbin trunk 4a with screws. The flange plate 4c outer peripheral side is beveled toward the fore end.

Reel Handling and Operation

When casting, the bail 43 is tripped into the line-releasing posture. The first and second bail-support members 40, 42 thereby rotate in the same direction, with the pivotal axis M as the center.

When fishing line is wound in, the bail 43 is tripped into the line-retrieving posture. In this state, rotating the handle 1 in the line-retrieving direction transmits the rotational force to the pinion gear 12 via the handle shaft 10 and the face gear 11. The rotational force transmitted to the pinion gear 12 is transmitted to the rotor 3 via the front 12a of the pinion gear 12.

Meanwhile, the gear piece 21 in the oscillating mechanism 6, which meshes with the drive gear 11b, rotates attendant on rotation of the face gear 11; and the rotation is transmitted to the slider 22 by either of the two cams 21a, 21b. Consequently, the slider 22 reciprocates along the axial direction X FIG. 1 of the spool shaft 20.

Figure 7A:
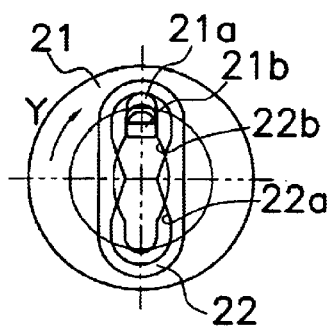
FIGS. 7A–7K are schematic views depicting the positional relationship between the slider and the cams on the gear piece when the oscillating mechanism shifts.
Figure 7B:
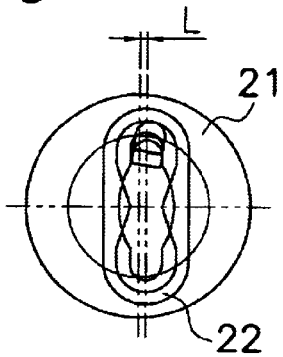
Figure 7C:
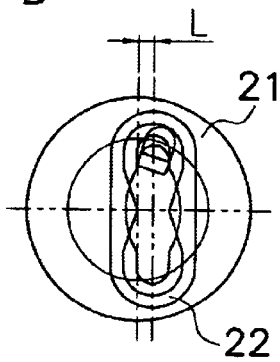
Figure 7D:
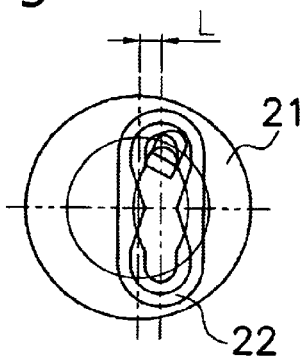
Figure 7E:
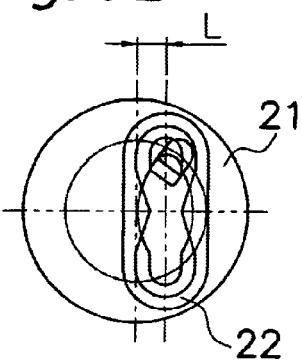

In this situation, as shown in FIG. 7A, when the slider 22 has come back to the intermediate position from the forward position, the first and second cams 21a, 21b are disposed on at the top, and the spool 4 is disposed midway. In this state, the first cam 21a is positioned at the vertex (center) of the first semicircular arc 26a in the first cam-engagement slot 22a. Given that the travel distance from the center of the gear piece 21 to the slider 22 in the front-to-rear direction is L, the travel distance at this point is 0.

In this state, rotating the handle 1 in the line-retrieving direction rotates the gear piece 21 clockwise as indicated by the arrow Y in FIG. 7. Change every 9 degrees in the state of engagement when the gear piece 21 in this situation rotates 90 degrees is depicted in FIG. 7. At this time, the second cam 21b engages into the second cam-engagement slot 22b, slowing the shifting velocity with respect to rotation, until it rotates into the 45-degree rotational position shown in FIG. 7F. That is, when the gear 21 rotates, engagement of the first cam 21a and the first cam-engagement slot 22a gradually comes apart, and the second cam 21b and the second cam-engagement slot 22b engage, which puts the slow-speed cam to work pressing the engagement surface 25a on the second cam 21b against the second cam-engagement slot 22b and gradually retracting the slider 22 from the state FIG. 7A shows, in which the slider 22 is in the mid position of its stroke.

Figure 7F:
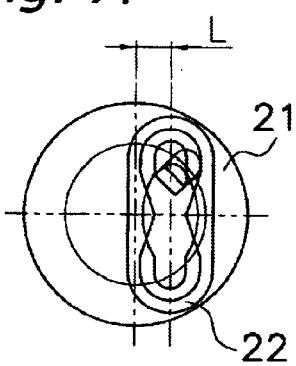
Figure 7G:
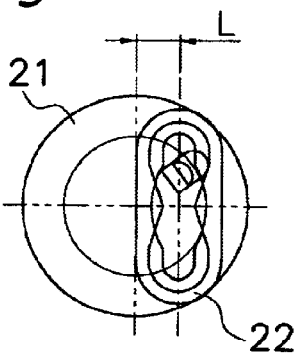
Figure 7H:
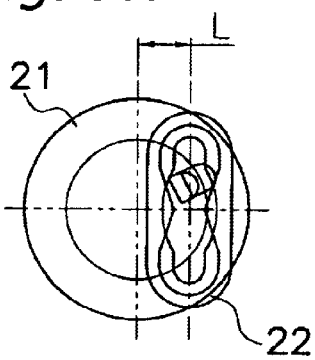
Figure 7I:
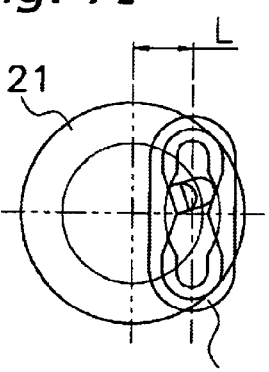
Figure 7J:
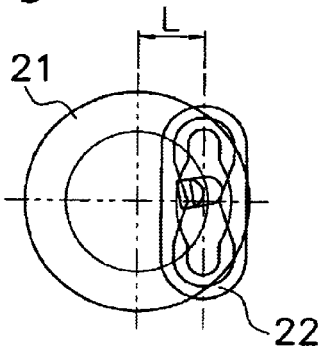
Figure 7K:
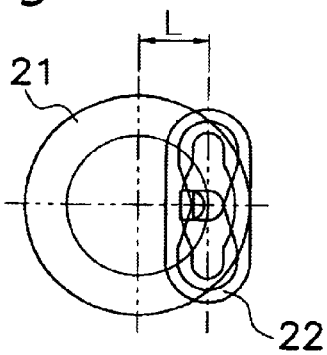

In turn, when it rotates into the 45-degree rotational position shown in FIG. 7F, the first cam 21a engages the first opposing portion 26b on the first cam-engagement slot 22a, and engagement of the first cam 21a and the first cam-engagement slot 22a puts the high-speed cam to work, pressing on and shifting the slider 22. That is, in the FIG. 7F 45-degree rotational position, the low-speed cam switches over to the high-speed cam. Then the engagement surface 24a on the first cam 21a, while engaging the first sloped portion 26c on the first cam-engagement slot 22a, presses on the slider 22. The fact that the first sloped portion 26c is an inclined surface that gradually narrows the interval acts to maintain the shifting velocity equal in speed to that of the rotation of the gear piece 21. Uniform-velocity rectilinear motion is therefore maintained to the rear end of the stroke. When the rear-end position shown in FIG. 7K is then attained, the engagement surface 24a on the first cam 21a comes into contact with the first cam-engagement slot 22a, and at the same time, the engagement surface 25b on the second cam 21b comes into contact with the second cam-engagement slot 22b. Now, during these travels the engagement surface 25b on the second cam 21b is in constant contact with the second cam-engagement slot 22b. This curtails jerkiness when the slider 22 shifts.

Figure 8:
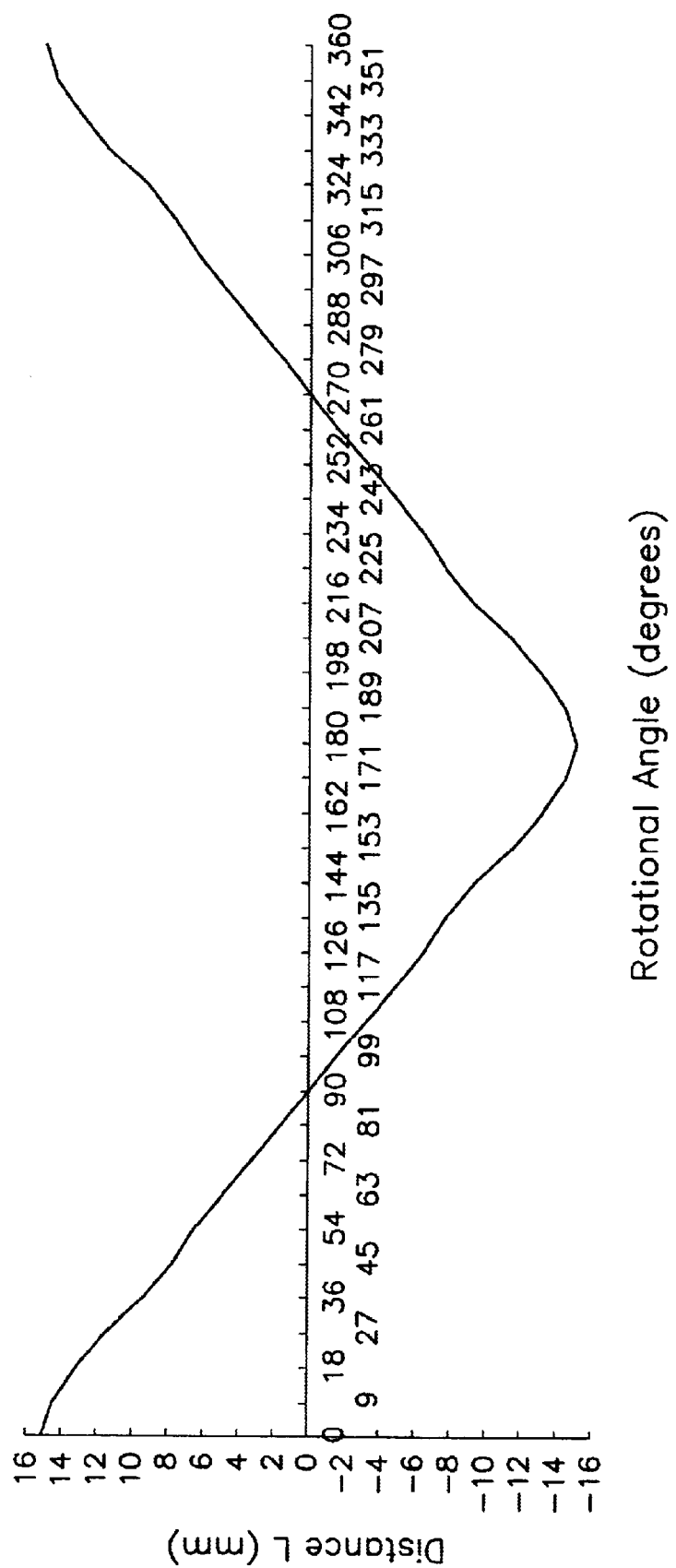
FIG. 8 is a graph showing relationship between gear piece rotational position and slider shifting distance.

Change in stroke when the slider goes through one cycle is illustrated in FIG. 8. In FIG. 8, the shifting distance L of the slider 22 from its center position takes the vertical axis, and the rotational position of the gear piece 21 from its retracted position takes the horizontal axis. For convenience, the stroke of the spool's travel is set herein at 15 mm. The range in rotational position in FIG. 8 from 270 degrees to 360 degrees indicates the slider 22 shifting velocity during the travel illustrated in FIG. 7. In conventional oscillating mechanisms of the type geared down by an engagement pin, this graph would be a cosine curve, but in the present embodiment, it is nearly a first-order straight line. The line-winding lay is therefore improved to a near flat form.

Now, when the slider 22 attains the rear-end position of its stroke, the engagement surface 25b on the second cam 21b comes into contact with the sloped surface 27c on the second cam-engagement slot 22b, and the slider 22 is pressed and shifted frontward. At this time, the engagement surface 21a on the first cam 21a is engaged with the first cam-engagement slot 22a. Therefore, engagement of the first cam 21a in the first cam-engagement slot 22a under rotation until returning from FIG. 7K to FIG. 7F puts the high-speed cam to work, shifting the slider 22. Then, going from FIG. 7F until the middle where FIG. 7A is reached, engagement of the second cam 21b in the second cam-engagement slot 22b puts the low-speed cam to work, shifting the slider 22.

Herein, the configuration is such that the low-speed cam is employed in an angular range of about 45 degrees from the intermediate position, beyond which the high-speed cam is employed toward either end, and furthermore such that when the high-speed cam is put to work the first sloped portion 26c on the first cam-engagement slot 22a is utilized, which maintains uniform-velocity rectilinear motion; therefore a state near uniform rectilinear motion is realized as a whole. For this reason, the configuration is simple, using no excess parts, and transmission losses are curbed, which improves the line-winding lay.

Second Embodiment

A front-drag type spinning reel was explained as an example in the foregoing first embodiment, but the present invention may be applied also to rear-drag type spinning reels and lever-drag type spinning reels.

Figure 9:
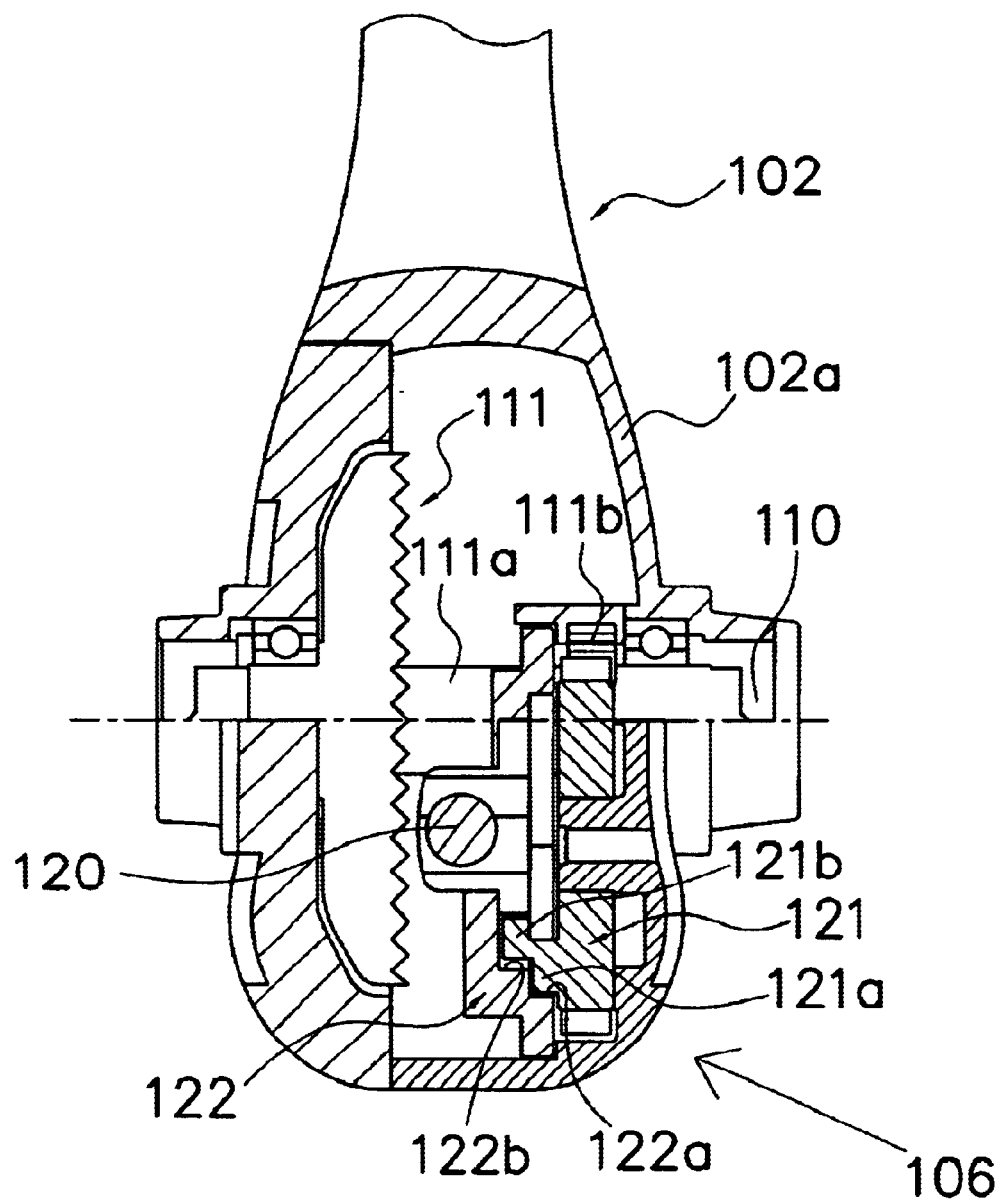
FIGS. 9 through 15 are views illustrating a second embodiment of the invention, and correspond respectively to FIGS. 2 through 8.
Figure 10:
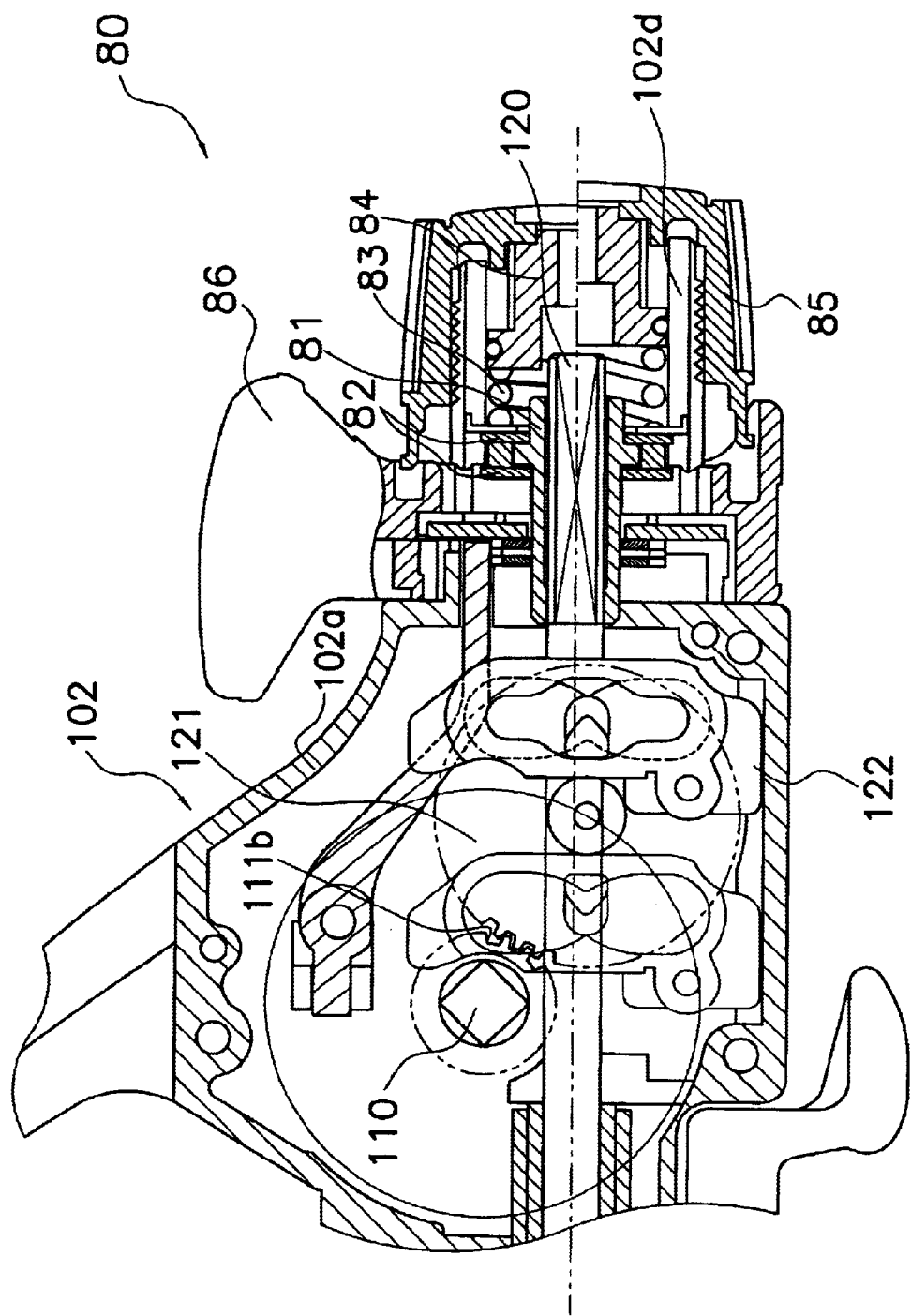
Figure 11:
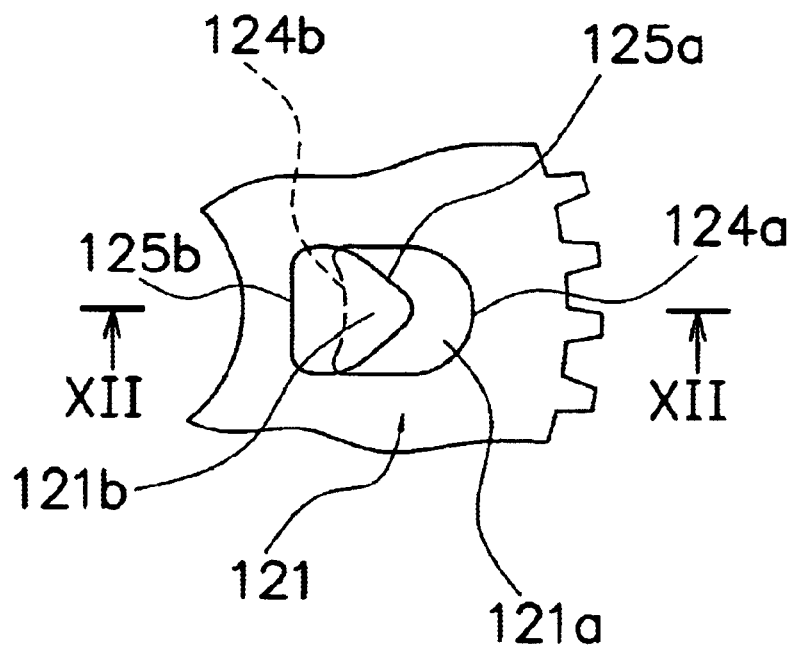

In FIG. 9, a spool (not shown in the figure) is detachably fitted onto, non-rotatably relative to, the fore end of a spool shaft 120 an in a rear-drag type spinning reel.

The oscillating mechanism 106 includes: a gear piece 121 that rotates in cooperation with a face gear 111, and a slider 122 that in cooperation with rotation of the gear piece 121 reciprocates in the spool axial direction. The slider 122 is free to turn relative to the spool shaft 120, but is immobilized axially. The portion in the slider 122 through which the spool shaft 120 penetrates is therefore made circular. The reel body 102a structures the slider 122 such that it travels parallel to the spool shaft 120.

The gear piece 121 is fitted to a wall surface of the body 102a rotatively around an axis approximately parallel to the handle shaft 110. The gear piece 121 meshes with a drive gear 111b formed on the shaft portion 111a of the face gear 111. A first cam 121a and a second cam 121b that project toward the slider 122 are formed on the rim of the gear piece 121 lateral face opposing the slider 122.

The first cam 121a, as shown in FIG. 9 through FIG. 12, projects toward the slider 122 from the lateral face of the gear piece 121, and is located diametrically further outward than the second cam 121b. A diametrically outward engagement surface 124a on the first cam 121a is a semicircular arc shape, while its inward engagement surface 124b is a circular arcuate face diametrically larger than the engagement surface 124a. A diametrically outward engagement surface 125a on the second cam 121b is a triangular in form, rounded at the tip, while its inward engagement surface 125b is rectilinear in form, slightly rounded at either end. The second cam 121b is of the same width as the first cam 121a, but is slightly shorter in length running diametrically. The second cam 121b further projects from the first cam 121a toward the slider 122 in stepped fashion. The two cams 121a, 121b are formed in the same circumferential position on the gear piece 121.

By means of the reel unit 102 the slider 122 is supported free to reciprocate axially parallel to the spool shaft 120. The slider 122 is non-rotatably, axially immovably attached hind-endwise to the spool shaft 120, on the fore end of which is the spool. A first cam-engagement slot 122a into which the first cam 121a on the gear piece 121 engages, and a second cam-engagement slot 122b into which the second cam 121b engages are formed on the lateral face of the slider 122 that opposes the gear piece 121. Engagement of the first cam 121a and the first cam-engagement slot 122a, and engagement of the second cam 121b and the second cam-engagement slot 122b, realize a high-speed cam and a low-speed cam, respectively.

Figure 12:
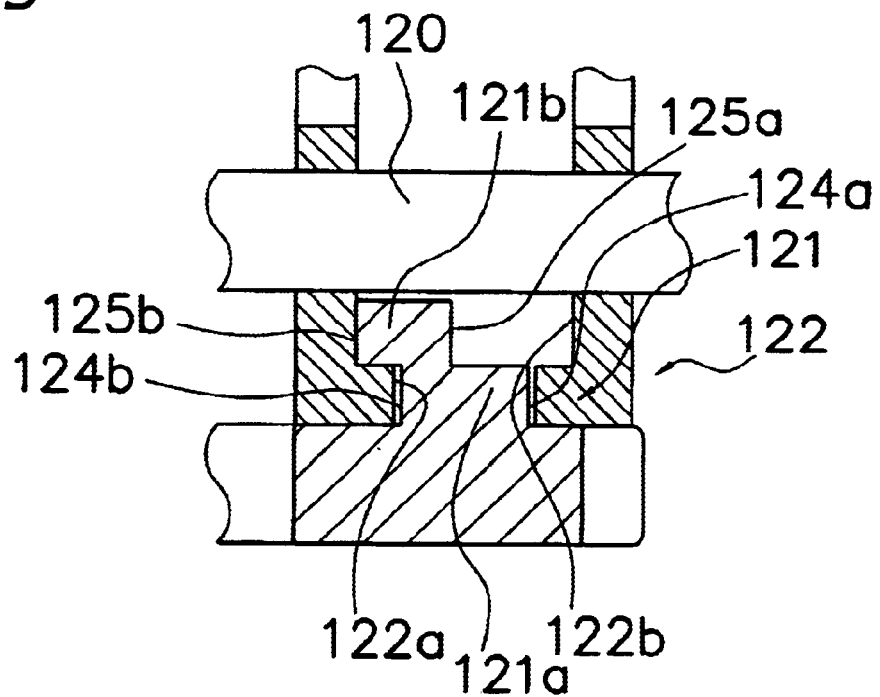
Figure 13:
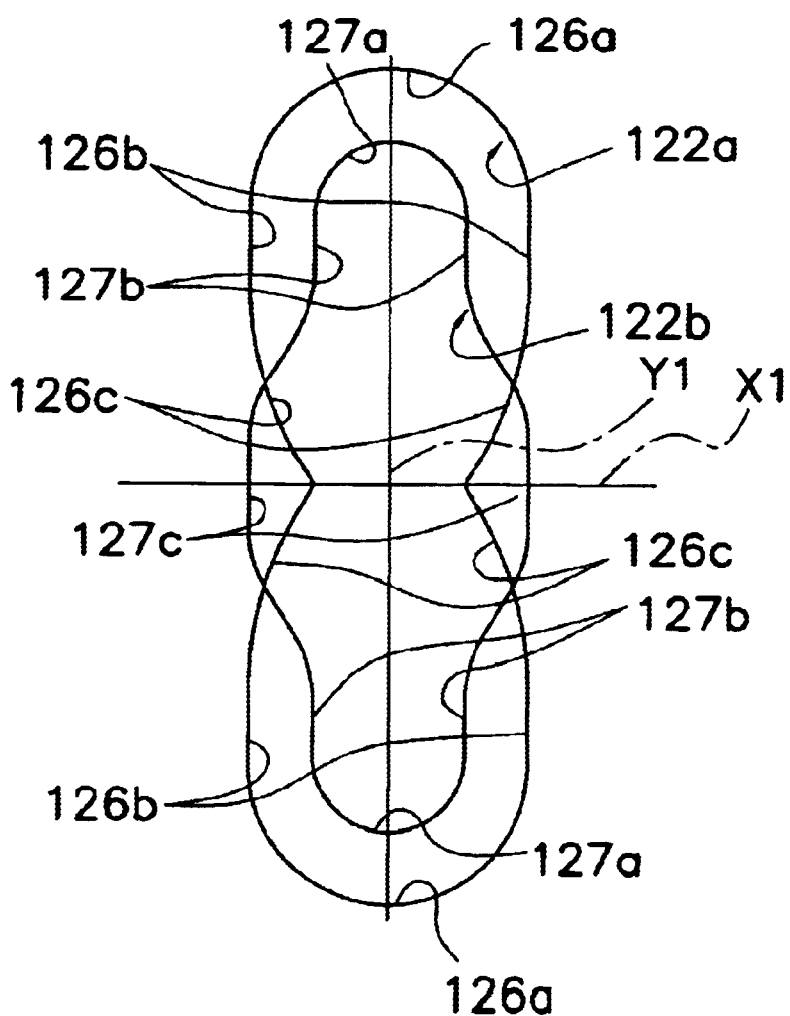

The two slots 122a, 122b, as shown in FIG. 12 and FIG. 13, extend in a first axis Y1 direction orthogonal to the spool shaft 120 center axis X1, are slots shaped symmetrically with respect to the first axis Y1, and are formed queued in the projecting direction of the first and second cams 121a, 121b. Further, the two slots 122a, 122b are in the form of slots symmetrical with respect to the second axis X1, which is orthogonal to the first axis Y1 and at the same time goes through the rotational center axis of the gear piece 121. For engagement with the first cam 121a, the length of the first cam-engagement slot 122a in the direction orthogonal to the spool shaft 120 is longer than the second engagement slot 122b.

The first cam-engagement slot 122a includes: first semicircular arcs 126a, formed at either end in the direction orthogonal to the spool shaft 120; first opposing portions 126b formed curving convexly outward slightly heading from the first semicircular arcs 126a toward the second axis X1; and first sloped portions 126c formed slanting from the first opposing portions 126b toward the center of the slot 122a while being curved convexly outward slightly such that the interval narrows gradually. Herein, the first semicircular arcs 126a and the first opposing portions 126b may be of form such that the first cam 121a does not engage them; they need not be of a semicircular and slightly curving form. The portion that engages the first cam 121a is from the first opposing portion 126b boundaries, stretching along the first sloped portions 126c, and this conformation is the crucial factor with regard to the slider 122 shifting speed.

The second cam-engagement slot 122b includes: second semicircular arcs 127a, formed diametrically smaller than the first semicircular arcs 126a, at either end in the direction orthogonal to the spool shaft 120; second opposing portions 127b formed in parallel heading from the second semicircular arcs 127a toward the second axis X1; and second sloped portions 127c formed sloping from the second opposing portions 127b toward the second axis X1 such that the interval broadens gradually, then in parallel on either side of the second axis X1, orthogonal to the second axis X1, becoming wider along the way than the first sloped portions 126c. The second sloped portions 127c are of a form enabling the engagement surface 125b on the second cam 121b to be in constant contact while the first engagement surface 124a on the first cam 121a is engaged in the first cam-engagement slot 122a.

The interval between the second opposing portions 127b is substantially the same as or somewhat larger than the width of the second cam 121b. The interval between on the one hand the first sloped portions 126c and on the other the second sloped portions 127c along their centers (on the second axis X1), is substantially the same as or somewhat greater than the length from the engagement surface 124a on the first cam 121a to the engagement surface 125b on the second cam 121b. Engagement between the first cam 121a and the first cam-engagement slot 122a, and engagement between the second cam 121b and the second cam-engagement slot 122b switch over midway, converting the rotational movement of the gear piece 121 into reciprocating rectilinear movement of the slider 122 and pumping the spool in the spool shaft direction.

Herein, the conversion ratio of rotational movement to reciprocation in the high-speed cam by engagement of the diametrically outward positioned first cam 121a with the first cam-engagement slot 122a, is larger than the ratio in the low-speed cam by engagement of the second cam 121b with the second cam-engagement slot 122b. Therefore, due to the switching over of the two cam types such that high-speed cam engagement—in rotational positions about 45 degrees from either end of the stroke of the slider 22, where its shifting speed becomes slower—and low-speed cam engagement—in an about 45-degree rotational position in the intermediate portion, where the shifting speed gets faster—respectively take place, the rotational movement is converted into a state near uniform-velocity rectilinear motion. Further, when the slider 122 is under engagement with the first cam 121a, the fact that the first sloped portions 126c that make the interval narrower are provided means that on either end the amount of movement per rotational angle accompanying shifting is large, such that uniform rectilinear motion is sustained.

The rear-drag mechanism 80 is lever-type, and is composed chiefly of: a circular cylindrical bushing 81; friction engagers 82 made up of a plurality of friction plates; a frictionally impelling coil spring 83; a support member 84; a fixing cap 85; and a drag lever 86.

The bushing 81 is inserted over the rear end of the spool shaft 120, where it is non-rotatable yet permitted to slide. The bushing 81 has a flange portion, and the plurality of friction engager 82 friction plates presses on the flange portion. The fixing cap 85 is screwed onto, through the outer periphery of a threaded portion formed outer circumferentially on a tubular projection 102d formed on the rear-end portion of, the reel body 102a, and locates the support member 84 into a predetermined position. By adjusting the amount by which the fixing cap 85 is tightened on, the pressing force of the friction engager 82 friction plates can be varied, which macro-adjusts the drag force. Further, by working the drag lever 86, the drag force set by the fixing cap 85 can be finely micro-adjusted in the range of 0–500 g.

Then in the thus configured second embodiment, the gear piece 121 in the oscillating mechanism 106, which meshes with the drive gear 111b, rotates attendant on rotation of the face gear 111; and the rotation is transmitted to the slider 122 by either of the two cams 121a, 121b. Consequently, the slider 122 reciprocates along the axial direction X of the spool shaft 120.

In this situation, as shown in FIG. 14A, when the slider 122 has come back to the intermediate position from the forward position, the first and second cams 121a, 121b are disposed at the top, and the spool is disposed midway. In this state, the first cam 121a is positioned at the vertex (center) of the first semicircular arc 126a in the first cam-engagement slot 122a. Given that the travel distance from the center of the gear piece 121 to the slider 122 in the front-to-rear direction is L, the travel distance at this point is 0.

Figure 14:
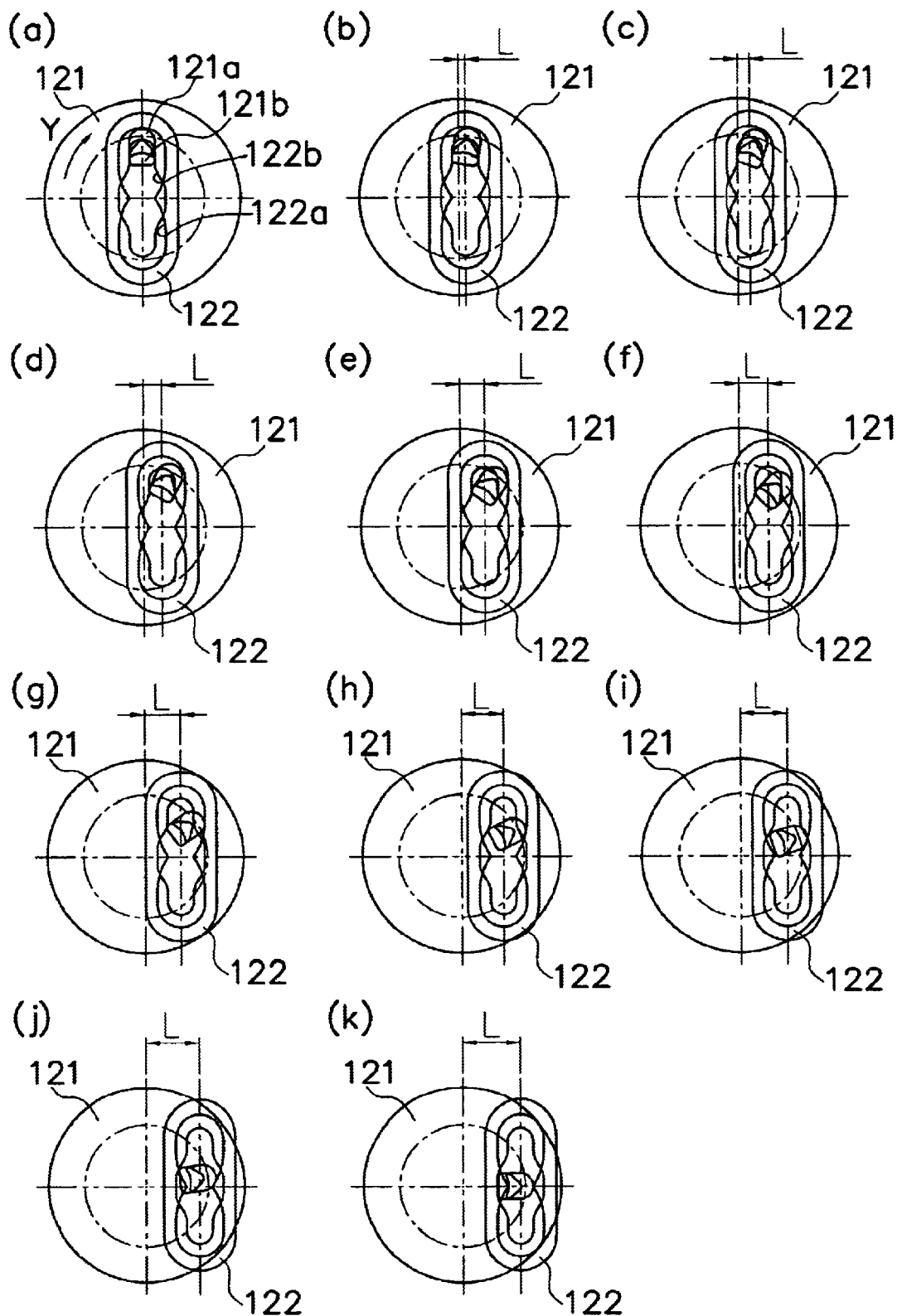

In this state, rotating the handle 1 in the line-retrieving direction rotates the gear piece 121 clockwise as indicated by the arrow Y in FIG. 14. Change every 9 degrees in the state of engagement when the gear piece 121 in this situation rotates 90 degrees is depicted in FIG. 14. At this time, the second cam 121b engages into the second cam-engagement slot 122b, slowing the shifting velocity with respect to rotation, until it rotates into the 45-degree rotational position shown in FIG. 14F That is, when the gear 121 rotates, engagement of the first cam 121a and the first cam-engagement slot 122a gradually comes apart, and the second cam 121b and the second cam-engagement slot 122b engage, which puts the slow-speed cam to work, pressing the engagement surface 125a on the second cam 121b against the second cam-engagement slot 122b and gradually retracting the slider 122 from the state FIG. 14A shows, in which the slider 122 is in the mid position of its stroke.

In turn, when it rotates into the 45-degree rotational position shown in FIG. 14F, the first cam 121a engages the first opposing portion 126b on the first cam-engagement slot 122a, and engagement of the first cam 121a and the first cam-engagement slot 122a puts the high-speed cam to work, pressing on and shifting the slider 122. That is, in the FIG. 14F 45-degree rotational position, the low-speed cam switches over to the high-speed cam. Then the engagement surface 121a on the first cam 121a, while engaging the first sloped portion 126c on the first cam-engagement slot 122a, presses on the slider 22. The fact that the first sloped portion 126c is an inclined surface that gradually narrows the interval acts to maintain the shifting velocity equal in speed to that of the rotation of the gear piece 121. Uniform-velocity rectilinear motion is therefore maintained to the rear end of the stroke. When the rear-end position shown in FIG. 14K is then attained, the engagement surface 121a on the first cam 121a comes into contact with the first cam-engagement slot 122a, and at the same time, the engagement surface 125b on the second cam 121b comes into contact with the second cam-engagement slot 122b. Now, during these travels the engagement surface 125b on the second cam 121b is in constant contact with the second cam-engagement slot 122b. This curtails jerkiness when the slider 122 shifts.

Figure 15:
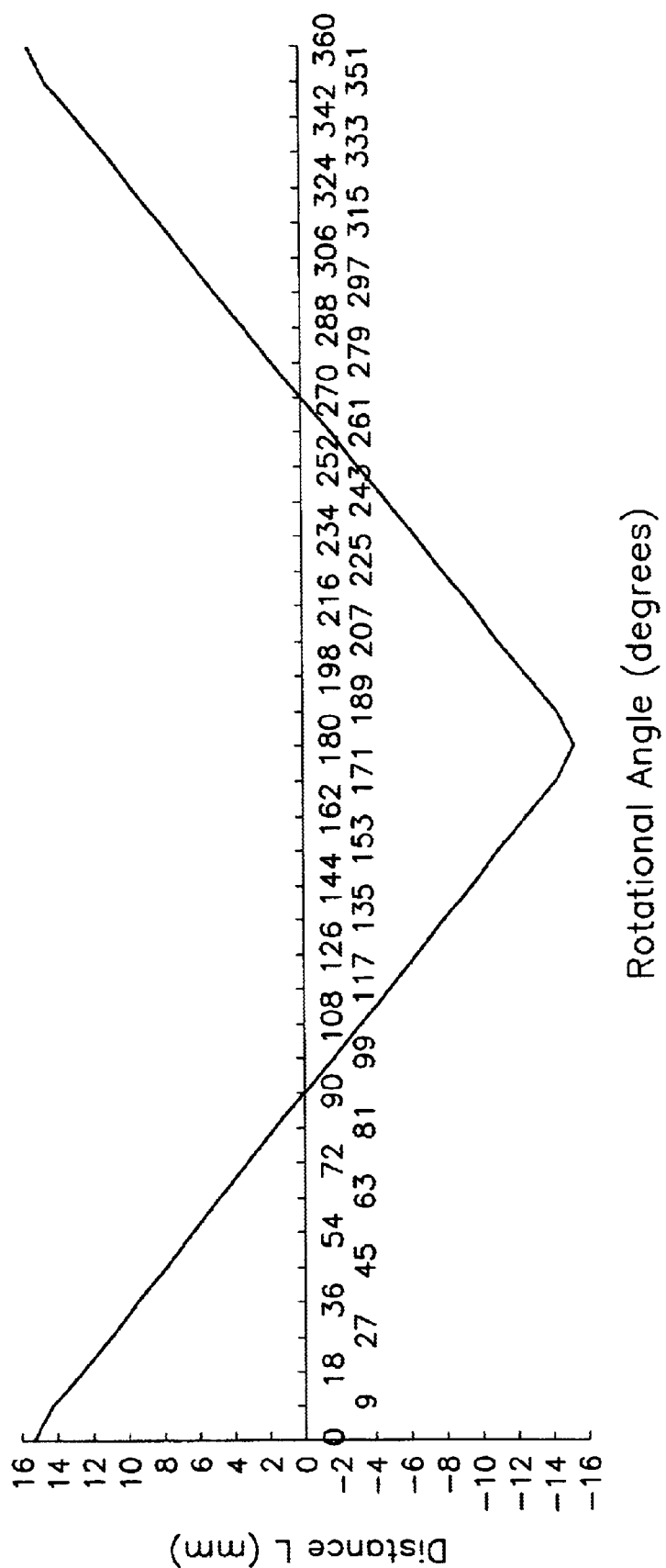

Change in stroke when the slider goes through one cycle is illustrated in FIG. 15. In FIG. 15, the shifting distance L of the slider 122 from its center position takes the vertical axis, and the rotational position of the gear piece 121 from its retracted position takes the horizontal axis. For convenience, the stroke of the spool's travel is set herein at 15 mm. The range in rotational position in FIG. 15 from 270 degrees to 360 degrees indicates the slider 122 shifting velocity during the travel illustrated in FIG. 14. In conventional oscillating mechanisms of the type geared down by an engagement pin, this graph would be a cosine curve, but in the present embodiment, it is nearly a first-order straight line. The line-winding lay is therefore improved to a near flat form.

Now, when the slider 122 attains the rear-end position of its stroke, the engagement surface 125b on the second cam 121b comes into contact with the sloped surface 127c on the second cam-engagement slot 122b, and the slider 122 is pressed and shifted frontward. At this time, the engagement surface 124a on the first cam 121a is engaged with the first cam-engagement slot 122a. Therefore, engagement of the first cam 121a in the first cam-engagement slot 122a under rotation until returning from FIG. 14K to FIG. 14F puts the high-speed cam to work, shifting the slider 122. Then, going from FIG. 14F until the middle where FIG. 14A is reached, engagement of the second cam 121b in the second cam-engagement slot 122b puts the low-speed cam to work, shifting the slider 122.

Herein, the configuration is such that the low-speed cam is employed in an angular range of about 45 degrees from the intermediate position, beyond which the high-speed cam is employed toward either end, and furthermore such that when the high-speed cam is put to work the first sloped portion 126c on the first cam-engagement slot 122a is utilized, which maintains uniform-velocity rectilinear motion; therefore a state near uniform rectilinear motion is realized as a whole. For this reason, the configuration is simple, using no excess parts, and transmission losses are curbed, which improves the line-winding lay.

Other Embodiments (a) In the foregoing first embodiment, the first cam 21a and the second cam 21b are shaped with engagements surfaces 24a, 25a on the one hand that are semispherical, and with engagement surfaces 24b, 25b on the other hand that are rectangular, but the first cam 21a and the second cam 21b may be of any configuration as long as their contact positions in the configuration are staggered diametrically on the gear piece 21. Moreover, the first cam 21a may be positioned diametrically inward of the second cam 21b.

(b) In the foregoing embodiments, engagement is switched over between two different cams, but engagement may be switched over among three or more different cams.

(c) In the foregoing embodiments, two cams are formed on one rotary member, but two rotary members sandwiching the slider may be provided, such that a cam may be provided on each rotary member.

(d) In the foregoing embodiments, the cams and cam engagement slots are configured as two-dimensionally curved surfaces, but may be configured as three-dimensionally curved surfaces such that the contact position in the axial direction on the gear piece varies continuously.

Because the present invention reciprocatingly shifts the slider component by the dual-type cam switchover between first and second cams in first and second cam-engagement slots, the slider component reciprocates in a state near uniform-velocity rectilinear motion, improving the line-winding lay. Moreover, extra parts need not be provided between the rotary member and the slider component, simplifying the configuration and making the sliding components fewer, which maintains high drive-power transmission efficiency.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A spinning-reel oscillating mechanism for oscillating the spinning reel spool axially in cooperation with handle rotation, the spinning-reel oscillating mechanism comprising:
   a rotary member for rotating around an axis approximately parallel to the handle rotational axis, in cooperation with rotation of the handle, said rotary member having;
   a first cam provided on said rotary member, and
   a second cam, provided on said rotary member, whose diametric position differs at least partially from that of said first cam; and
   a slider member attached, immovably at least in the spool axial direction, rear-endwise to a spool shaft on the fore end of which is the spool, and fitted in the reel body free to shift in the spool axial direction, said slider member having
   a through-hole formed thereon,
   a first cam engager provided in said through-hole of said slider member, extending in a direction intersecting the spool axis, for engaging said first cam, and
   a second cam engager provided in said through-hole of said slider member, extending in the same direction as said first cam engager, for engaging said first cam;
   said slider member being oscillated in the spool axial direction by engagement on at least the part of either said first cam and said first cam engager, or of said second cam and said second cam engager.

2. The spinning-reel oscillating mechanism set forth in claim 1, wherein said first cam projects diametrically outward more than said second cam.

3. The spinning-reel oscillating mechanism set forth in claim 2, wherein:
   said first cam and said first cam engager engage mainly when said slider member is immediate either end of its stroke; and
   said second cam and said second cam engager engage mainly when said slider member is immediate the middle of its stroke.

4. The spinning-reel oscillating mechanism set forth in claim 2, wherein said first cam and second cam are formed in step fashion.

5. The spinning-reel oscillating mechanism set forth in claim 4, wherein the diametrically outside engagement surfaces on said first cam and said second cam for engaging said first cam engager and said second cam engager are respectively rounded into semicircular form.

6. The spinning-reel oscillating mechanism set forth in claim 4, wherein:
   the diametrically outside engagement surface on said first cam for engaging said first cam engager is rounded into a semicircular form; and
   the diametrically outside engagement surface on said second cam for engaging said second cam engager is shaped into a triangular form whose tip assumes sphericity.

7. The spinning-reel oscillating mechanism set forth in claim 2, wherein:
   intervals are formed in said first and second said cam engagers, symmetrically with respect to a first axis orthogonal to the spool shaft, and with respect to a second axis orthogonal to the first axis and at the same time coinciding with the rotational center axis of said rotary member; and the interval in said first cam engager is narrower along said second axis than the interval in said second cam engager, and the interval in said first cam engager gradually widens going away from the second axis on either side in the first axis direction, along the way becoming wider than the interval in said second cam engager.

8. The spinning-reel oscillating mechanism set forth in claim 1, wherein said first cam and said second cam are provided in the same circumferential position projecting sideways from said rotary member and parallel to the handle rotational axis.

9. The spinning-reel oscillating mechanism set forth in claim 1, wherein both said cams have diametrically inside and outside engagement surfaces with which both said cam engagers respectively engage.

10. The spinning-reel oscillating mechanism set forth in claim 9, wherein:

when the diametrically outside engagement surface on said first cam is engaged with said first cam engager, the diametrically inside engagement surface on said second cam is engaged with said second cam engager; and when the diametrically outside engagement surface on said second cam is engaged with said second cam engager, the diametrically inside engagement surface on said first cam is engaged with said first cam engager.

11. The spinning-reel oscillating mechanism set forth in claim 1, wherein said second cam is formed projecting from said first cam, and parallel to the handle rotational axis.

12. A spinning reel, comprising:

a reel unit having a handle;

a rotor supported free to rotate on a front of said reel unit;

a spool disposed on a front of said rotor, such that fishing line is wound onto said rotor, said spool being axially movable in cooperation with rotation of said handle; and an oscillating mechanism for oscillating said spool axially in cooperation with rotation of said handle, said oscillating mechanism having a rotary member for rotating around an axis approximately parallel to the handle rotational axis, in cooperation with rotation of the handle, said rotary member having;

a first cam provided on said rotary member, and a second cam, provided on said rotary member, whose diametric position differs at least partially from that of said first cam; and a slider member attached, immovably at least in the spool axial direction, rear-endwise to a spool shaft on the fore end of which is the spool, and fitted in the reel body free to shift in the spool axial direction, said slider member having a through-hole formed thereon, a first cam engager provided in said through-hole of said slider member, extending in a direction intersecting the spool axis, for engaging said first cam, and a second cam engager provided in said through-hole of said slider member, extending in the same direction as said first cam engager, for engaging said first cam;

said slider member being oscillated in the spool axial direction by engagement on at least the part of either said first cam and said first cam engager, or of said second cam and said second cam engager.

13. The spinning reel set forth in claim 12, wherein said first cam projects diametrically outward more than said second cam.

14. The spinning reel set forth in claim 13, wherein:

said first cam and said first cam engager engage mainly when said slider member is immediate either end of its stroke; and said second cam and said second cam engager engage mainly when said slider member is immediate the middle of its stroke.

15. The spinning reel set forth in claim 13, wherein:

intervals are formed in said first and second said cam engagers, symmetrically with respect to a first axis orthogonal to the spool shaft, and with respect to a second axis orthogonal to the first axis and at the same time coinciding with the rotational center axis of said rotary member; and the interval in said first cam engager is narrower along said second axis than the interval in said second cam engager, and the interval in said first cam engager gradually widens going away from the second axis on either side in the first axis direction, along the way becoming wider than the interval in said second cam engager.

16. The spinning reel set forth in claim 12, wherein said first cam and said second cam are provided in the same circumferential position projecting sideways from said rotary member and parallel to the handle rotational axis.

17. The spinning reel set forth in claim 12, wherein both said cams have diametrically inside and outside engagement surfaces with which both said cam engagers respectively engage.

18. The spinning reel set forth in claim 17, wherein:

when the diametrically outside engagement surface on said first cam is engaged with said first cam engager, the diametrically inside engagement surface on said second cam is engaged with said second cam engager; and when the diametrically outside engagement surface on said second cam is engaged with said second cam engager, the diametrically inside engagement surface on said first cam is engaged with said first cam engager.

19. The spinning reel set forth in claim 12, wherein said second cam is formed projecting from said first cam, and parallel to a rotational axis of said handle.

20. The spinning reel set forth in claim 12, wherein the diametrically outside engagement surfaces on said first cam and said second cam for engaging said first cam engager and said second cam engager are respectively rounded into semicircular form.

* * * * *